No. 768,427.

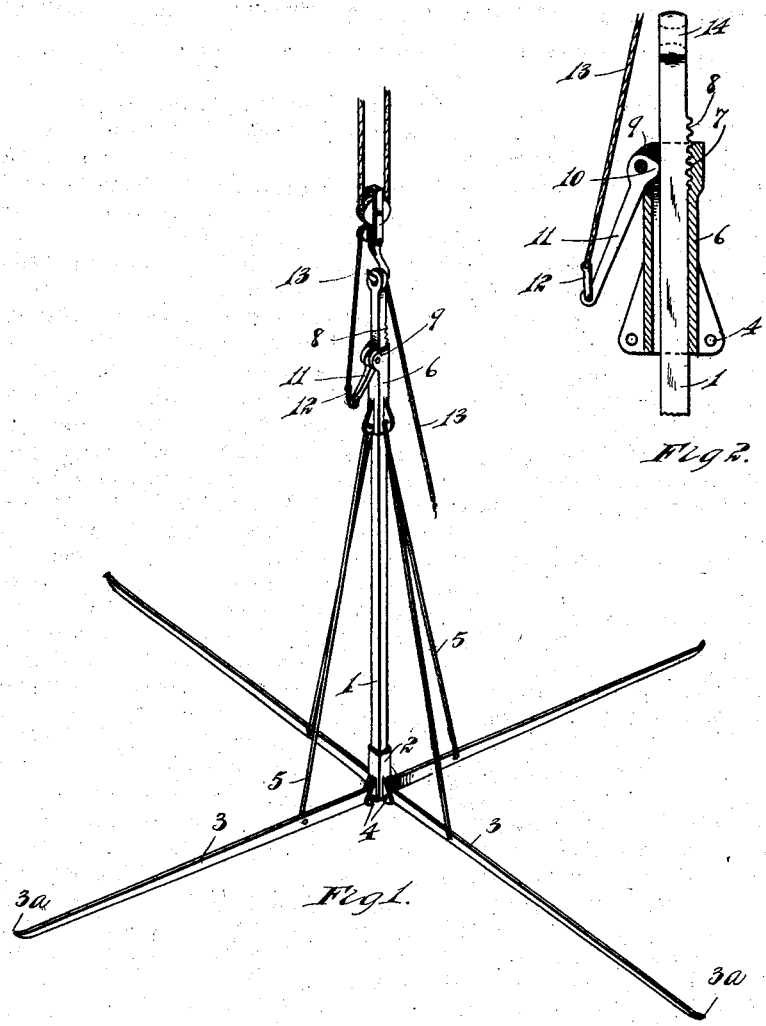

Patented August 23, 1904.

UNITED STATES PATENT OFFICE.

FRANK CRAWFORD AND CHARLES HIGBY, OF WEST BLOOMFIELD, MICHIGAN.

DEVICE FOR UNLOADING HAY.

SPECIFICATION forming part of Letters Patent No. 768,427, dated August 23, 1904.

Application filed March 30, 1904. Serial No. 200,663. (No model.)

*To all whom it may concern:*

Be it known that we, FRANK CRAWFORD and CHARLES HIGBY, citizens of the United States, residing at West Bloomfield, county of Oakland, State of Michigan, have invented a certain new and useful Improvement in Devices for Unloading Hay; and we declare the following to be a full, clear, and exact description of the invention, such as will enable others skilled in the art to which it pertains to make and use the same, reference being had to the accompanying drawings, which form a part of this specification.

This invention relates to implements for unloading hay, and has for its object an improved implement intended and adapted to be placed on the wagon at the time hay is loaded thereonto and to be used to remove the hay from the wagon as an unloading device, taking the place for unloading purposes of the ordinary horse hay-fork, but being used differently in respect to the way it is itself loaded.

In the drawings, Figure 1 is a perspective showing the implement. Fig. 2 is a detail of the tripping device.

1 indicates a stem provided at one end with a head 2, which contains sockets for several arms 3, that swing on pivots 4 and are capable of swinging from a position with their points $3^a$ folded into nearly close contact with the stem 1 to a position in which the points $3^a$ approach each other and are nearly in the axial extension of the stem 1. Each arm 3 has pivotally connected to it intermediate its length a link 5, which is pivoted at its other end to a sliding sleeve 6 on the stem 1. The sleeve 6 is provided at one side with a rack of teeth 7, that travels adjacent to a fixed rack of teeth 8 on the stem 1. On sleeve 6 opposite the rack 7 are ears 9, in which is journaled an eccentric 10, with a handle or shank 11 terminated with an eye through which engages or may engage a hook 12, which terminates a trip-line 13.

The upper end of the stem 1 terminates with an eye 14, through which the hook of the hay-carrier can engage. The hook of the hay-carrier has connected with it a pulley over which the trip-rope 13 is bent, and the hay-carrier and the trip-rope are connected and disconnected from the implement at its time of use, as will be understood from an explanation of the way of employing the implement, which is as follows: The implement is placed with the arms spread in the bottom of a wagon and the hay is loaded thereon, the loading continued until the load has reached the top of the stem, leaving enough of the end of the stem 1 projecting to enable the user to slip the hook through it and to slip the hook of the trip-rope through the trip-lever 11.

One, two, or more implements may be placed on the wagon, and care is taken that in loading the hay piled upon one implement does not felt into the hay on another implement. After a sufficient load has been placed on one implement another is placed above the first, and a second section of the load is built up on the upper implement. Two, four, or more implements may be employed in a load, depending upon the size to which it is to be built. Generally four unloading implements of this kind will suffice for as large a load as a team can conveniently draw over ordinary roads and through ordinary fields.

When the load has been drawn to the place of unloading, the hook of the ordinary hay-carrier or hay-fork is engaged through the eye in the top of the stem 1 and the section of load which is connected with this unloading implement lifted, carried to the proper place, the trip-line 13 is drawn, and the entire load drops from the implement to its final place of deposit.

What we claim is—

1. In an implement for unloading hay, the combination of a stem, arms pivotally connected thereto adapted to fold into alinement with the stem, a runner on said stem, links holding the arms thereto, and means for holding the runner secured to the stem by a tripping device, substantially as described.

2. In an implement for unloading hay, a framework adapted to be spread, a stem rising from a central point of said framework, a runner sleeved on said stem and links tying the spreading part of the frame thereto, a rack of teeth on said stem and a rack of teeth carried by the runner and adapted to swing in the engagement with the teeth on the stem, a cam adapted to lock the two racks in engagement, and a trip operating said cam, substantially as described.

3. In an implement for unloading hay, in combination with the stem provided with an eye for the engagement therethrough of a hook, arms pivotally connected to the stem, a runner on said stem, links pivoted to the runner and the said arms, a locking member on the stem and a locking member on the runner, and a trip-actuated cam adapted to engage with and actuate one of said locking members, substantially as described.

4. In an implement for unloading hay, the combination of a stem one end of which is perforated to form an eye, a runner on said stem, arms pivotally connected to the stem, links attaching said arms to said runner, and means for holding the runner secured to the stem by a tripping device, substantially as described.

In testimony whereof we sign this specification in the presence of two witnesses.

FRANK CRAWFORD.
CHARLES HIGBY.

Witnesses:
 MAY E. KOTT,
 CHARLES F. BURTON.